(12) United States Patent
Lancha Fernandez et al.

(10) Patent No.: US 11,118,570 B2
(45) Date of Patent: Sep. 14, 2021

(54) SUPPORT STRUCTURE FOR WIND-DRIVEN POWER GENERATORS

(71) Applicant: PACADAR, S.A., Madrid (ES)

(72) Inventors: Juan Carlos Lancha Fernandez, Illescas (ES); Manuel Cidoncha Escobar, Madrid (ES); Eduardo Salete Casino, Madrid (ES); Francisco Javier Martinez De Castaneda, Madrid (ES)

( * ) Notice: Subject to any disclaimer, the term of this patent is extended or adjusted under 35 U.S.C. 154(b) by 0 days.

(21) Appl. No.: 16/635,468

(22) PCT Filed: Aug. 16, 2018

(86) PCT No.: PCT/IB2018/056172
§ 371 (c)(1),
(2) Date: Jan. 30, 2020

(87) PCT Pub. No.: WO2019/026056
PCT Pub. Date: Feb. 7, 2019

(65) Prior Publication Data
US 2021/0088028 A1 Mar. 25, 2021

(30) Foreign Application Priority Data
Aug. 2, 2017 (EP) ..................................... 17382536

(51) Int. Cl.
*F03D 13/20* (2016.01)
(52) U.S. Cl.
CPC ........ *F03D 13/20* (2016.05); *F05B 2240/912* (2013.01); *F05B 2260/301* (2013.01)

(58) Field of Classification Search
CPC ........................... F03D 13/20; F03B 2240/912
See application file for complete search history.

(56) References Cited

U.S. PATENT DOCUMENTS

| | | | |
|---|---|---|---|
| 2013/0224020 A1* | 8/2013 | Dagher | B63B 5/14 416/84 |
| 2015/0176299 A1* | 6/2015 | Aranzadi De Miguel | E04H 12/342 52/79.4 |
| 2016/0007241 A1 | 1/2016 | Zuteck | |
| 2016/0010621 A1* | 1/2016 | Zuteck | E04H 12/345 52/40 |

FOREIGN PATENT DOCUMENTS

| | | |
|---|---|---|
| DE | 102015115562 A1 | 3/2017 |
| EP | 2857614 A1 | 4/2015 |

* cited by examiner

*Primary Examiner* — Sean Gugger
(74) *Attorney, Agent, or Firm* — Eugenio J. Torres-Oyola; Victor M. Rodriguez-Reyes; Rafael Rodriguez-Muriel (57) ABSTRACT

The present invention relates to a support structure for wind-driven power generators comprising a tubular tower (1) with multiple superposed, post-tensioned annular sections (20) from the crown to the foundation, each being formed by at least two pieces of prefabricated concrete wall (10) defining between them vertical joints (12), each wall piece (10) having two transverse joint faces (13) and two vertical joint faces (14); wherein in the vertical joints (12), the vertical joint faces are arranged facing one another and lack structural connectors between them for the transmission of structural stresses, allowing for an independent structural behavior of the mentioned wall pieces (10), the height of the wall pieces (10) being less than twice their width.

16 Claims, 8 Drawing Sheets

SUPPORT STRUCTURE FOR WIND-DRIVEN POWER GENERATORS

FIELD OF THE ART

The present invention relates to the field of support structures for wind-driven power generators provided with a tower made up of wall pieces of prefabricated concrete attached to one another forming superposed annular sections that are subsequently post-tensioned.

STATE OF THE ART

Support structures for wind-driven power generators obtained by means of stacking annular sections made up of wall pieces of prefabricated concrete are known.

PACADAR's patent document EP2631393, for example, is known to describe a system of this type, but in which the wall pieces of each annular section have a great height, the entire tubular tower being made up of a few, for example, three, four or five, annular sections. This complicates the manufacturing, transport and lifting of said wall pieces, leading to more expensive labor.

Furthermore, the proposed solution in this patent document requires the wall pieces of one and the same annular section to be laterally connected by means of a structural connection, for example, an annular post-tensioning around each annular section, structural screws, reinforcing bars, mortar and/or in situ concrete casting.

This requires the wall pieces to include structural reinforcements designed for channeling stresses to those points in which the structural connectors will be installed, complicating the manufacturing thereof, and requires performing tasks of making structural connection in each annular section by means of said structural connectors, requiring complicated operations that must be performed at a great height. For example, post-tensioning requires specific machinery that must be lifted to the position where said post-tensioning is performed, and structural screws are large screws that an operator can hardly lift by hand, or must be lifted one by one or in small quantities, slowing down the installation thereof, and the injection of mortar requires using pumping machines and formworks making the commissioning more expensive and slowing it down.

Furthermore, this patent document does not contemplate complete post-tensioning of the entire tubular tower in the entire length thereof, but rather uses local post-tensioning in each transverse joint of the tubular tower, this being the reason why the number of transverse joints is kept small by using wall pieces having a large size.

Patent document EP1474579 is also known to make express reference to the attachment of the wall pieces to one another by means of bolts located horizontally, vertically and diagonally, thereby achieving a structural attachment between the wall pieces, the purpose of which is for the entire tubular tower to behave as a single whole. This requires said bolts to act as structural connectors, where the use of heavy structural bolts is therefore necessary, and requiring in addition to the installation, in each wall piece, anchorages sized for withstanding and transmitting said structural stresses through the wall piece, concentrating said stresses in the structural anchorages.

All these features make manufacturing the wall pieces, as well as the tasks of assembling them, difficult and more expensive.

Furthermore, this patent document mentions that the wall pieces must have a height equal to or greater than twice the diameter of the tubular tower. This means that even if each annular section is formed by only two wall pieces, each of them will have a height greater than twice its width, where these wall pieces are therefore very tall with a small base, and when subjected to a horizontal load at the upper end thereof, will generate a large bending moment that their base can hardly sustain without the structural collaboration of the adjoining wall pieces.

Patent document FR1145789A also describes a tubular tower, in this case a chimney, made up of wall pieces, which are subsequently post-tensioned from the apex to the base.

However, this patent document proposes for all the wall pieces to be attached by means of screws to the upper, lower and side wall pieces, thereby achieving an integral assembly, which requires a large number of screwed attachments, complicating the assembly of the structure and slowing it down.

BRIEF DESCRIPTION OF THE INVENTION

The present invention relates to a support structure for wind-driven power generators. Said structure comprises, as is known in the state of the art, a tubular tower provided with a hollow inner space including multiple superposed annular sections defining between them transverse joints, each annular section being formed by at least two pieces of prefabricated concrete wall defining between them vertical joints, each wall piece having a circular arc- or polygonal arc-shaped horizontal section the length of which defines the width of the wall piece, a straight vertical section the length of which defines the height of the wall piece, two transverse joint faces and two vertical joint faces defining the thickness of the wall piece on the perimeter thereof;

foundation defining a support plane for the tubular tower;

upper fixing configurations connected to the uppermost annular section of the tubular tower and lower fixing configurations connected to the foundation;

post-tensioning cables connecting the upper fixing configurations and lower fixing configurations compressing the superposed wall pieces with one another, said post-tensioning cables running along the hollow inner space of the tubular tower or the outside thereof;

wherein the vertical joints of successive annular sections do not coincide with one another.

The described tubular tower is therefore formed by superposed annular sections, and each of said annular sections is in turn formed by several wall pieces arranged surrounding the hollow inner space of the tubular tower.

Each wall piece will be made of precast concrete, the concrete being able to be prestressed concrete, post-tensioned concrete, or concrete provided with passive reinforcements or even reinforced with fibers or combination of the foregoing.

Each wall piece will have a circular arc- or polygonal arc-shaped horizontal section. This means that a circular annular section or a polygonal annular section will be formed when putting together said wall pieces, and also that each wall piece, when it is in a vertical position, will have a stability greater than the stability of a completely flat wall piece, as a result of said circular or polygonal annular section shape.

The joints existing between superposed annular sections will be referred to as transverse joints, and the vertical joints existing between wall pieces of one and the same annular section will be referred to as vertical joints.

The uppermost annular section of the tubular tower, i.e., the annular section farthest away from the ground, will be connected to upper fixing configurations where the upper ends of post-tensioning cables will be anchored. The lower end of said post-tensioning cables will in turn be anchored to lower fixing configurations fixed to the foundation of the tubular tower.

As a result, said post-tensioning cables will run along the inside or outside of the tubular tower and downwardly press annular sections against one another, compressing the wall pieces. This allows increasing the resistance of the tubular tower to horizontal wind loads.

The present invention further proposes the following, which is not known in the prior state of the art:
in the vertical joints, the vertical joint faces of two adjacent wall pieces of one and the same annular section are arranged facing one another and lacking structural connectors between them for the transmission of structural stresses, allowing an independent structural behavior;
the height of the wall pieces is less than twice their width It will be understood that structural stresses are those stresses to which the structure and the different parts thereof are subjected due to the weight supported by said structure, and stresses generated by the post-tensioning plus other loads to which said structure is subjected during its service life, such as for example, the loads produced due to the action of the wind on the tower and on the wind-driven power generator, and other loads such as vibrations, earthquakes, etc.

When a structural load is applied on a wall piece, the load is vertically transmitted from this wall piece to the vertically adjacent wall pieces until reaching the foundation. For example, the weight of the wind-driven power generator rests on the wall pieces forming the uppermost annular section of the tubular tower, and from there the loads are successively transmitted from one annular section to the section immediately below, compressing the wall pieces until reaching the foundation.

When the stresses that have to be withstood are not vertical, such as the horizontal thrust caused by the wind against the blades of the wind-driven power generator, for example, the typical solution consists of connecting the superposed wall pieces for transmitting the shear stresses created by the horizontal load of the wind, and also laterally connecting the wall pieces of one and the same annular section, such that each annular section is an integral section.

The horizontal loads applied at the upper end of the tubular tower cause a bending moment. Since the wall pieces of each annular section are laterally attached, each of said annular sections acts integrally and breaks down said bending moment into a load with a downward component compressing the face of the tubular tower located leeward (sheltered from the wind), and into another load with an upward component tensioning the face of the tubular tower located windward (exposed to the wind). The post-tensioning of the tubular tower, together with the actual weight of the tubular tower and the wind-driven power generator, overcome said upward load, preventing the tubular tower from turning over and compensating for the appearance of tensions in the concrete.

The solution proposed in the present invention differs from said typical solution in that the wall pieces of one and the same annular section lack structural connectors between them, so they have an independent structural behavior, particularly against said horizontal stresses.

In the proposed solution, horizontal stresses are transmitted in the form of shear stresses in each of the transverse joints, said stresses being transmitted from one wall piece to the piece immediately above or below at least by the friction existing between the faces thereof which are compressed with one another as a result of post-tensioning. The bending moment generated by said horizontal stress is distributed in each of the wall pieces, instead of in each annular section, so stresses with a vertical downward component are not concentrated on the leeward face of the tower, nor are stresses with a vertical upward component concentrated on the windward face of the tower, rather each wall piece transmits to the lower wall pieces a stress with a vertical upward component in the region thereof closer to the windward face of the tubular tower and another stress with a vertical downward component in the region thereof closer to the leeward face of the tubular tower. This allows distributing the loads throughout the entire annular section of the tower, preventing stresses from concentrating in a specific area of the structure.

It must be borne in mind that, due to the circular arc- or polygonal arc-shaped horizontal section, those wall pieces receiving a horizontal load perpendicular to their central area will transmit a load with a vertical downward component at the ends of their circular or polygonal arch shape and a load with a vertical upward component in their central area, or vice versa.

In contrast, those wall pieces receiving a horizontal load tangent to their central area will transmit a load with a vertical downward component at one end of their circular or polygonal arch shape and a load with a vertical upward component at the other end of their circular or polygonal arch shape.

In the present invention, when a horizontal load is applied on the blades of the wind-driven power generator, for example, said horizontal load is transmitted to each of the wall pieces forming the uppermost annular section of the tubular tower.

Said horizontal load is transmitted in the form of shear load in each of the transverse joints of the tubular tower all the way to the foundation.

However, given that the pieces cannot transmit horizontal stresses to the adjacent wall pieces, a bending moment is generated in each individual wall piece due to the horizontal load transmitted from the upper part thereof, which breaks down into two forces with a vertical component, since they are the only loads that it can transmit, one with a vertical downward component which is transmitted to the lower wall pieces, and another one with a vertical upward component which is transmitted to the upper wall pieces. The vertical upward load is balanced by other vertical downward loads such as the weight or post-tensioning of the tubular tower.

To assure the stability of each of said wall pieces against those horizontal loads, and to reduce the values of the loads with a vertical component into which it is broken down, there is a need to prevent the wall piece from having a height greater than twice the width of said wall piece, since the greater the height of the wall piece is in relation to its width, the greater the moment generated by the horizontal stresses on the base of the wall piece will be, as a result of the lever effect, and the greater the loads with a vertical component into which it is broken down will be. Limiting the proportion of the wall piece to said described range prevents excessive stresses with a vertical component that can hardly be sustained by the structure.

As a result of said feature, the horizontal loads of the wind are distributed throughout the entire annular section instead of being concentrated on windward and leeward faces, and the need to laterally attach the wall pieces with structural connections, which may be hard to install in view of the great heights these structures reach, is furthermore prevented.

It will be understood that, although structural connectors are not present in the vertical joints between wall pieces, other connectors such as assembly connectors which allow keeping wall pieces in place during lifting operations or while erecting the tubular tower can indeed be present. The assembly connectors will be connectors that do not transmit structural forces, or transmit stresses less than 10% the structural stresses existing at that point of the structure in which they are located, considered as residual stresses, the assembly connectors therefore being incapable of transmitting said structural stresses and therefore not substantially changing the structural operation that has been described.

Said assembly connectors allow fixing the wall pieces in place while the tubular tower is being erected, when post-tensioning of said tubular tower has yet to be performed.

Preferably, the vertical joint faces of two adjacent wall pieces of one and the same annular section are arranged facing one another and will lack structural screws, structural bolts, local post-tensioning, annular post-tensioning around an annular section, shear key configurations of the facing vertical joint faces, mortar or cast-in-situ concrete attachments acting by way of structural connectors for the transmission of structural stresses during the service life of the structure.

The shear key configurations are tongue and groove configurations, cam and pocket configurations or other commonly used in structural elements.

It is also contemplated for the vertical joint faces of two adjacent wall pieces of one and the same annular section to be able to be separated from one another defining a gap, thereby assuring the complete absence of transmission of stresses therebetween.

As mentioned above, according to an alternative embodiment the vertical joint faces of two adjacent wall pieces of one and the same annular section can be attached to one another by means of assembly connectors sized and configured for holding the wall pieces in place during assembly and configured for not transmitting structural stresses during the service life of the structure. As mentioned above, those stresses less than 10% the structural stresses envisaged at a point of the structure will not be considered structural stresses, but rather residual stresses, an assembly connector could therefore transmit a fraction of the stress from time to time provided that it is less than 10% the structural stress existing at that point of the structure. Said assembly connectors could be assembly adhesives such as silicones or assembly screws or bolts, for example.

In relation to the transverse joints of the transverse joint faces of the wall pieces of successive annular sections, it is proposed for said faces to be arranged facing and contacting one another, being pressed together by said post-tensioning cables, and for said facing and contacting transverse joint faces to define through contact a structural connection for the transmission of structural stresses.

Said transverse joints may not have any other structural connector, however, arranging in said transverse joints other structural connectors, such as through reinforcement or screws, or positioners structurally connecting the wall pieces of one annular section with the wall pieces of the successive annular section, is also proposed.

Said transverse joint faces can be flat and smooth faces lacking shear key configurations or can alternatively be provided with shear key configurations. If shear key configurations are included, the resistance of the structure to bending and shear stresses with a horizontal component will be increased given the increase in the resistance of the wall pieces of an annular section against moving horizontally with respect to the wall pieces of the annular section immediately below as a result of said shear key configurations.

According to another embodiment, the transverse joint faces of two adjacent wall pieces of superposed annular sections are arranged facing one another and lack structural screws, structural bolts, local post-tensioning, mortar, structural adhesives or cast-in-situ concrete attachments acting by way of structural connectors for the transmission of structural stresses during the service life of the structure.

Like the vertical joints, it is proposed for the transverse joint faces of two superposed wall pieces of adjacent annular sections to be able to be attached to one another by means of assembly connectors sized and configured for holding the wall pieces in place during assembly and configured for not transmitting the structural stresses during the service life of the structure. Stresses equal to or less than 10% the structural stresses existing at a point of the structure will not be considered structural stresses, but rather residual stresses that may be supported by and transmitted through said assembly connectors without this entailing a substantial change in the structural behavior of the tubular tower.

The features of the structure described up until now allow building the tubular tower without having to install structural connectors in the vertical joints once said wall pieces have been placed in the final location, which simplifies assembly operations.

If the wall pieces include assembly connectors or positioners, the placement thereof will be much simpler compared to structural connectors, given that the loads that they have to sustain are very small, and therefore they can be small sized connectors that can be easily handled and installed by a single operator with manual tools.

An additional advantage of this solution is that the number of vertical and horizontal joints (when the horizontal joints lack structural connectors) is no longer a factor relevant to the cost of the structure because the number of joints does not have to be kept small as no complex assembly operations are required. This allows reducing the size of the wall pieces, and therefore their weight, where the transport thereof becomes simpler and the lifting thereof to greater heights is allowed, which allows erecting taller towers at competitive prices.

Although the wall pieces are produced with maximum dimensional precision, small errors in the dimensions thereof having a cumulative effect when stacking successive annular sections, causing slight deviations of the verticality of the tubular tower, may occur.

Having increased the number of annular sections, said cumulative errors can also be increased.

To correct said deviation of the verticality, it is proposed for the wall pieces forming at least one annular section of the tubular tower to have transverse joint faces not parallel to one another, defining together a corrective annular section with a lower transverse joint and an upper transverse joint on planes not parallel to one another. This corrective annular section will act as a wedge, which will allow rectifying the inclination of the subsequent annular sections placed above said corrective annular section.

For the placement thereof, the inclination of the tubular tower will be measured in different steps of erecting the tower, and when a deviation from verticality greater than a certain threshold is detected, the mentioned corrective annular section will be placed in a position which allows rectifying the verticality of the tubular tower.

According to another embodiment, the tubular tower includes two consecutive corrective annular sections. The respective angular position of a corrective annular section with respect to the subsequent adjacent corrective annular section allows for the correction of the two successive corrective annular sections to be added up or canceled out. This allows preparing and manufacturing said corrective annular sections in the annular tower before knowing if there is a deviation in the tubular tower and placing said corrective annular sections in one position or another depending on whether or not a deviation is detected, or the degree of deviation detected.

It is also proposed for the tubular tower to include multiple non-consecutive corrective annular sections, allowing multiple corrections along the length thereof.

It is proposed for the aforementioned upper fixing configurations to be integrated in an uppermost metal ring of the tubular tower, said uppermost metal ring being supported on the transverse joint faces of the wall pieces of the last annular section of the tubular tower. Said uppermost metal ring can further include anchors for fixing a nacelle of a wind-driven power generator.

This solution allows, with a single element, anchoring post-tensioning cables, attaching the wall pieces of the uppermost annular section of the tubular tower to one another, and providing the anchoring of the nacelle to the tubular tower.

It will also be understood that the end values of any offered range of values may not be optimum and this range of values may require adaptations of the invention so that said end values are applicable, said adaptations being within the reach of a person skilled in the art.

Other features of the invention will be seen in the following detailed description of an embodiment.

BRIEF DESCRIPTION OF THE DRAWINGS

The foregoing and other advantages and features will be better understood based on the following detailed description of an embodiment in reference to the attached drawings, which must be interpreted in an illustrative and non-limiting manner, in which.

DETAILED DESCRIPTION OF AN EMBODIMENT

The attached drawings show illustrative non-limiting embodiments of the present invention.

Figure 1:
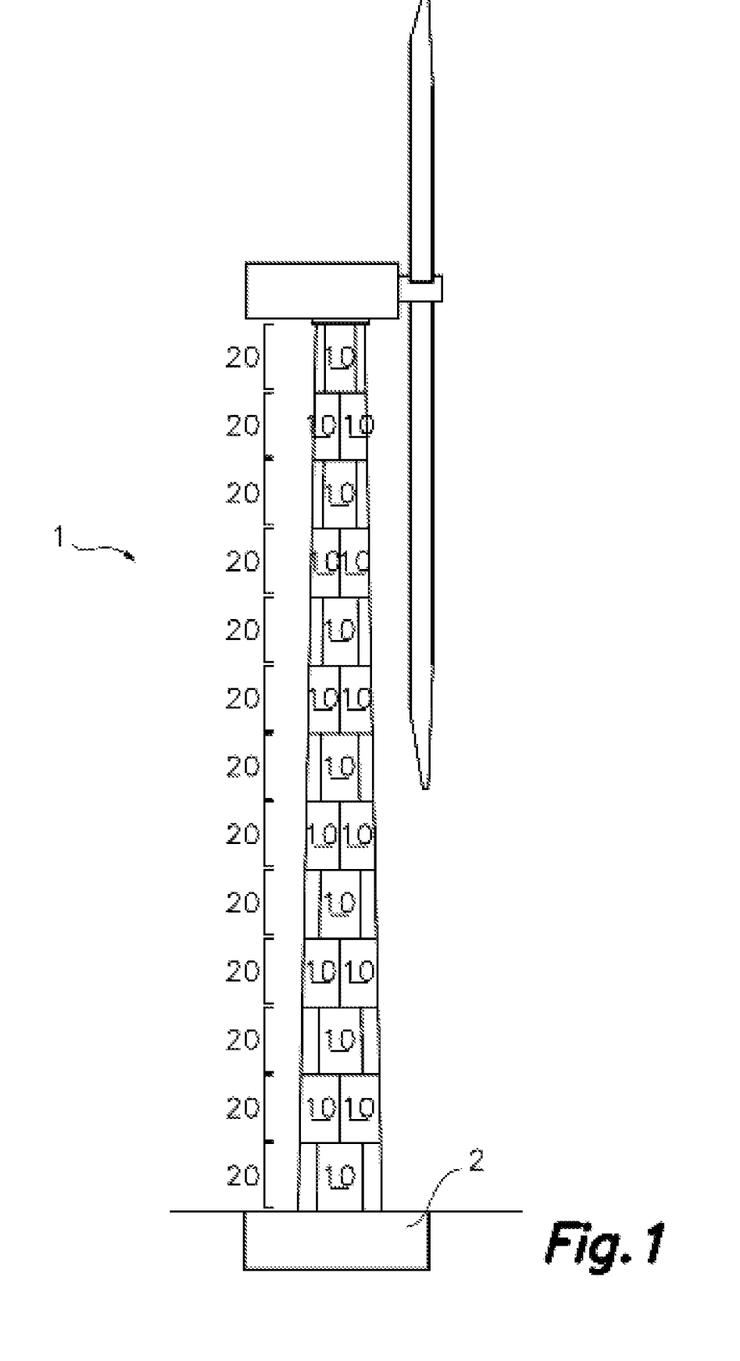
FIG. 1 shows a side elevational view of a support structure for wind-driven power generators such as the one proposed, including in the upper part thereof a wind-driven power generator and blades.

FIG. 1 shows a support structure for wind-driven power generators formed by multiple superposed annular sections 20 having a frustoconical section, a tubular tower 1 having a hollow inner space with an increasingly smaller cross-section thus being obtained.

Each annular section 20 is formed by multiple wall pieces 10 each with a cross-section in the form of annular section, such that a circular annular section is formed upon putting together all the wall pieces 10.

As it is obvious for a skilled person, if the wall pieces 10 have a cross-section in the form of a polygonal section, the annular section formed by said pieces will also have a closed polygonal section in the form of a tube.

The joints existing between superposed annular sections 20 are transverse joints 11, whereas the joints existing between the adjacent wall pieces 10 of one and the same annular section 20 are vertical joints 12.

The vertical joints 12 of an annular section 20 will not coincide with the vertical joints 12 of another annular section 20 that is immediately above or below in order to prevent structural weaknesses.

Figure 2:
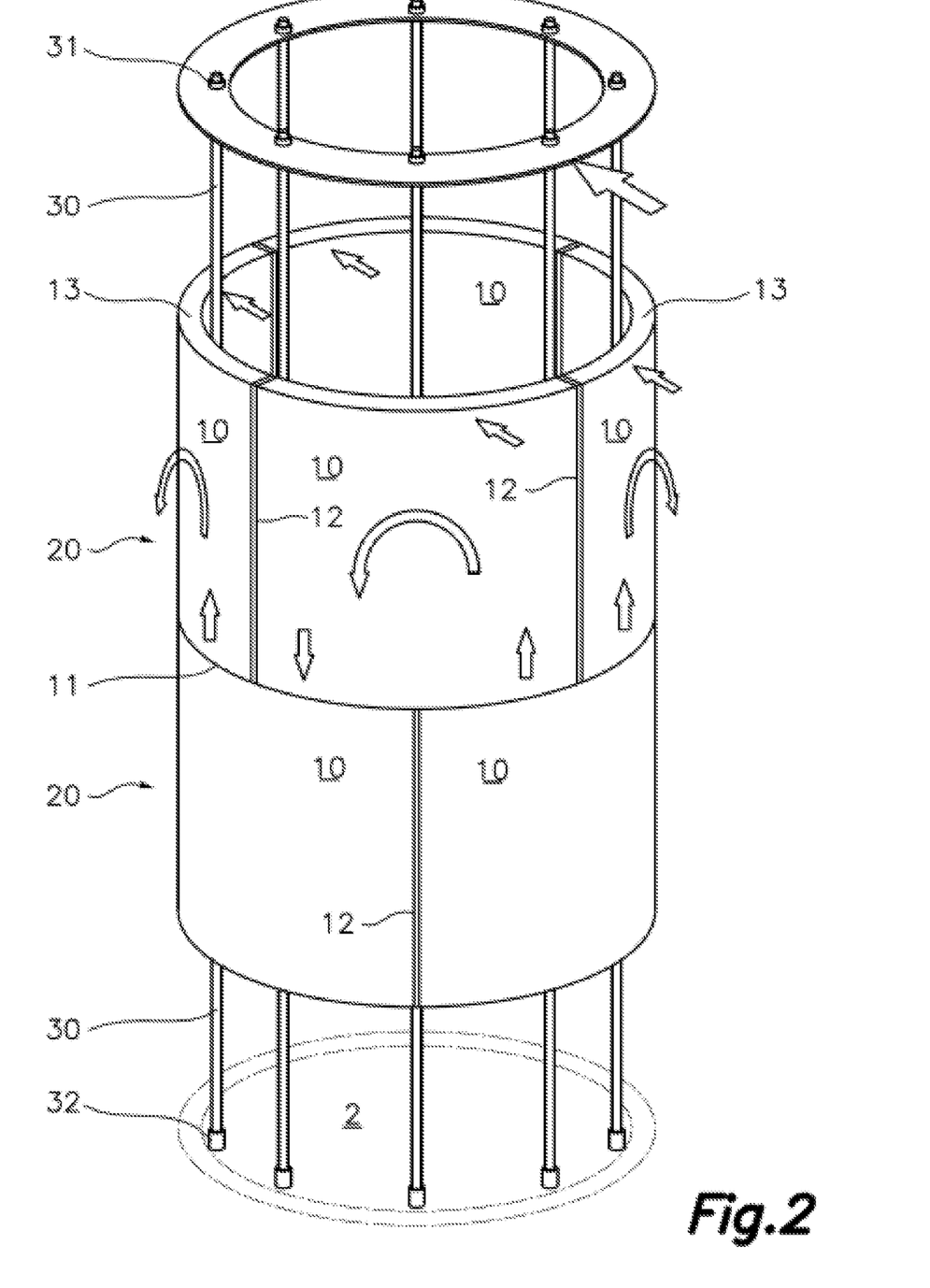
FIG. 2 shows in a perspective view the two superposed uppermost annular sections of the tubular tower, each formed by four wall pieces, the remaining annular sections having been removed to make the understanding of the drawing easier. The upper fixing configurations are also shown arranged around a metal ring which, in order to make the understanding of the drawing easier, has been shown separated from the uppermost annular section of the tower. This view also includes post-tensioning cables which are attached to the upper fixing configurations and lower fixing configurations anchored to the foundation of the tubular tower and run along the inside of the tower.

For example, as shown in detail in FIG. 2 the proposed solution can consist of four wall pieces 10 forming each annular section, and can consist of more than ten annular sections 20. The present invention is applied to towers of any height, where it can also be used for very tall towers above 150 meters in height and can include more than twenty annular sections 20.

Each wall piece 10 has two vertical joint faces 14 and two transverse joint faces 13. In the present example, all said vertical joint faces 14 and transverse joint faces 13 have the same thickness defining the perimeter thickness of the wall piece 10, the entire wall piece 10 having the same thickness in this example. This embodiment also corresponds with the embodiment shown in FIG. 8a.

However, it is contemplated that the wall piece 10 may be thinner than its perimeter thickness, the vertical joint faces 14 and/or the transverse joint faces 13 being defined by lips or widenings of the wall piece 10, thereby reducing the weight of each wall piece 10, as shown in FIGS. 8b to 8e, for example.

Figures 8A, 8B:
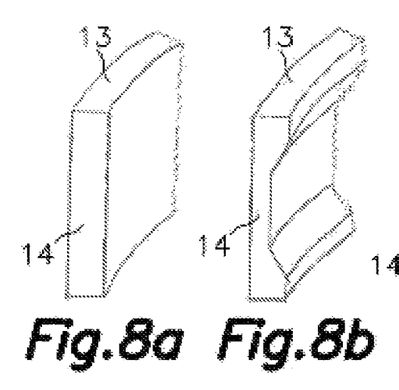
FIGS. 8*a* to 8*e* show perspective views of a portion of a wall piece according to several embodiments in which said wall piece has perimetral lips increasing the perimeter thickness of the wall piece in the transverse and/or vertical joint faces.
Figures 8C, 8D:
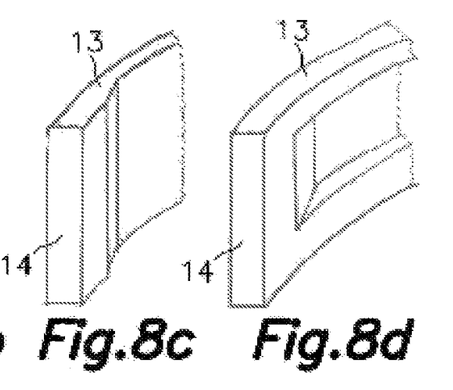
Figure 8E:
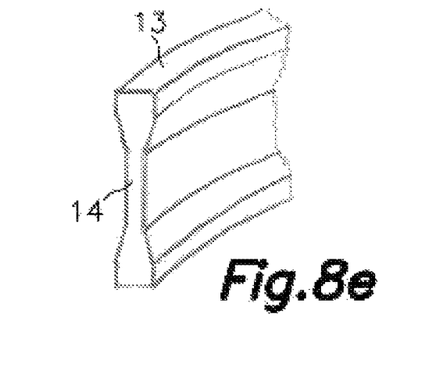

In the examples shown in FIGS. 8b and 8e, the vertical joint faces 14 have a variable width as a result of the variation in the thickness of the wall piece 10. In contrast, in the embodiment shown in FIG. 8c the vertical joint faces 14 have a constant width, but the transverse joint faces 13, however, have a variable width.

The superposition of annular sections 20 forms a tubular tower 1 having a hollow inner space. The last annular section 20, i.e., the one farthest away from the ground, is connected to upper fixing configurations 31 which, as shown in FIG. 2 in this example, consists of a metal ring which is supported on the transverse joint faces 13 of the last annular section 20 located farthest away from the ground. There are anchored to said upper fixing configurations 31 the upper ends of post-tensioning cables 30 running along the inside of the tubular tower 1 to the foundation 2 on which said tubular tower 1 is erected, where the lower ends of the post-tensioning cables 30 are anchored to the foundation 2 by means of lower fixing configurations 32.

Said upper fixing configurations 31 and lower fixing configurations 32 can consist of any of the conventionally known post-tensioning techniques.

In this embodiment, the transverse joint faces 13 of the wall pieces 10 are flat, smooth, horizontal faces, such that upon superposing the annular sections, the transverse joint faces 13 will be pressed together at the transverse joints 11 as a result of the weight of the structure and of the overloading caused by tensioning the post-tensioning cables 30, thereby securing the relative position of wall pieces 10 with respect to the pieces immediately above and below without requiring any additional structural connector connecting the superposed annular sections 20 to one another. This greatly facilitates and accelerates the tasks of building the tubular tower 1 as operations of making structural connection at a great height, which may be expensive, dangerous and slow, are not required.

It is understood that this is an exemplary embodiment but other embodiments in which the transverse joint faces are attached to one another by means of structural connectors, as shown in FIGS. 4 to 7, can also be considered.

Figure 3:
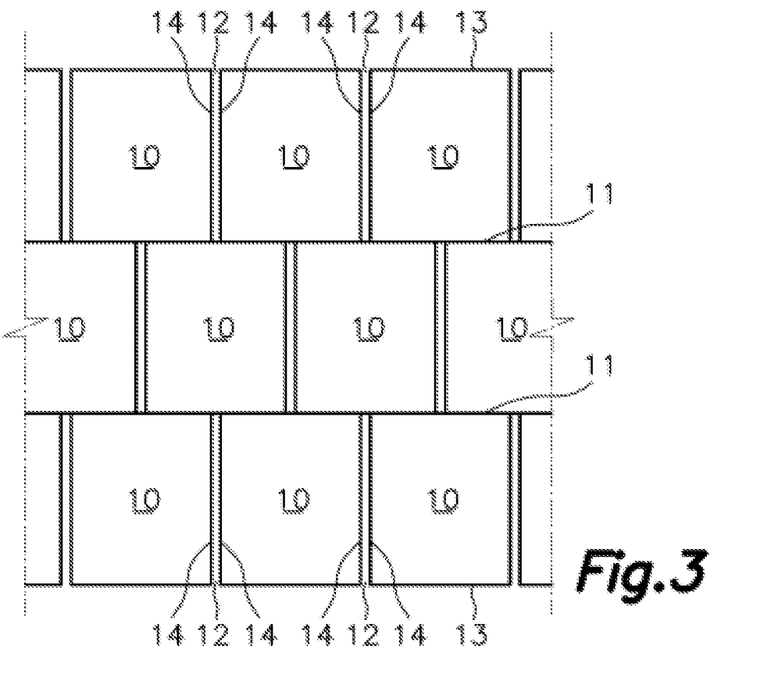
FIG. 3 shows a lateral development layout of the wall pieces making up the tubular tower according to a first embodiment in which there are no structural or assembly connectors between the wall pieces, and in which the vertical joint faces of the adjacent wall pieces are separated defining a gap.
Figure 4:
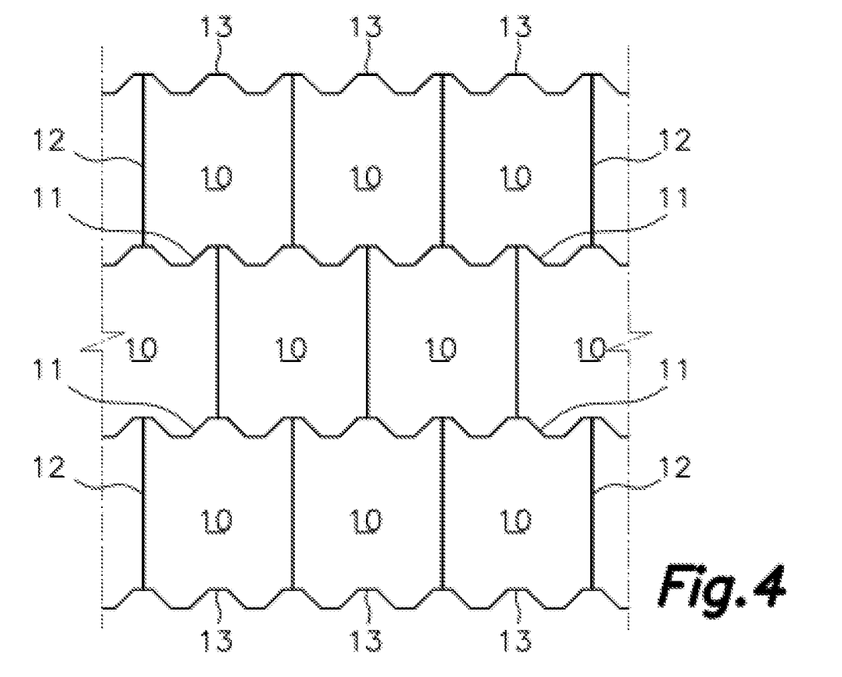
FIG. 4 shows a lateral development layout of the wall pieces making up the tubular tower according to a second embodiment in which there are no structural connectors between vertical joint faces of the wall pieces, which are contacting one another, and in which the transverse joint faces of the superposed wall pieces are provided with a shear key configuration.

The vertical joint faces 14 of the wall pieces 10 of those adjacent wall pieces 10 of one and the same annular section 20 are arranged facing one another, but lack any type of structural connector connecting them. Said vertical joint faces 14 can be arranged contacting one another, as shown in the embodiment of FIG. 4, or can even be spaced apart, leaving a gap therebetween, as shown in FIGS. 2 and 3, said gap being able to be subsequently sealed with silicone or another adhesive with little stress transmitting capacity, in order to prevent water or wind from entering the tubular tower, without this entailing a structural connection in any case.

This feature allows the wall pieces 10 to be able to behave in a structurally independent manner, particularly against horizontal actions such as the wind. Since the wall pieces 10 are not laterally connected to one another, each piece must transmit the horizontal load received to the lower and upper wall pieces 10.

A horizontal load applied a certain distance from the transverse joint face 13 will cause a bending moment on each wall piece, and said bending moment will break down into a vertical downward force, i.e., a compression force for compressing the wall pieces 10 arranged therebelow, and a vertical upward force, i.e., a tension force which, due to it being smaller than the downward loads caused by the weight of the structure and by post-tensioning, will be canceled out.

This allows the downward loads, or compression loads, generated as a result of the load of the wind to be distributed throughout the entire annular section of the tubular tower 1, instead of being concentrated in the leeward face as occurs with other constructive solutions, thereby reducing occasional overloading and allowing reducing the weight of the structure.

FIG. 2 shows by means of a large arrow a horizontal load transmitted from the wind-driven power generator to the metal ring provided with upper fixing configurations 31. Said horizontal load is caused by the wind impacting the blades of said wind-driven power generator, which will be connected to the metal ring.

Said metal ring is in contact with the transverse joint faces 13 of the wall pieces 10 of the last annular section 20 of the tubular tower 1, i.e., the one farthest away from the ground, although both said ring and joint faces were shown separated from one another in this drawing to make the understanding of the assembly easier. By means of said contact, the horizontal load applied to the metal ring is transmitted to and distributed among the upper ends of all the wall pieces 10 making up the uppermost annular section 20.

A smaller arrow in FIG. 2 indicates the horizontal force transmitted to each of the four wall pieces 10 making up the uppermost annular section 20.

Since the horizontal force is applied on the upper end of each wall piece 10, and since stresses cannot be transmitted to the laterally adjacent wall pieces 10 due to the absence of structural connectors, a bending moment, schematically indicated with a semicircular arrow in this drawing, is generated in each wall piece 10. Depending on the position of each of the wall pieces 10 with respect to the direction of the horizontal force, the mentioned bending moment will have one direction or another.

The described bending moment breaks down into a pair of vertical upward and downward forces that each wall piece must transmit individually to the lower wall pieces 10 through the transverse joint faces 13. Said vertical forces are indicated with vertical arrows in this drawing.

It will be understood that other stresses, such as shear stresses, are not indicated, and that the transmission of stresses is only partially indicated in order to make the understanding of the drawing easier. This drawing only shows two annular sections, and not all the annular sections 20 arranged therebelow all the way to the foundation, which are shown separately from the depicted annular sections 20 to make the understanding of the drawing easier.

Another additional advantage is that, since the attachments of the vertical joints 12 always lack structural connectors which are always expensive and complex to install, the costs are reduced and it allows reducing the size of the wall pieces 10 by increasing the number of joints without this entailing an increase in the cost of the structure. Wall pieces 10 having a smaller size are more easily transported and lifted to their final position, have lower logistics costs and result in tubular towers 1 having a greater height since smaller, and therefore more lightweight, wall pieces 10 can be lifted to greater height.

For this solution to be stable, the height of each wall piece 10 must not exceed two times its width, given that the bending moments will be greater the greater the height of the wall piece 10 is, and the two forces with a vertical component into which the mentioned bending moment breaks down will be larger the smaller the width of the wall piece is. It has thus been determined that a height:width ratio of 2:1 is the maximum ratio, where at ratios greater than this the stresses with a vertical component become excessive.

As an example, it is proposed for the wall pieces 10 to have a height equal to or less than 10 meters, where the width thereof is equal to or greater than 5 meters. Said dimensions can be changed, for example, by providing wall pieces with a height equal to or less than 5 meters and a width equal to or greater than 2.5 meters, preferably equal to or greater than 5 meters.

These dimensions significantly differ from conventional dimensions in the wall pieces 10 of tubular towers 1 made of prefabricated concrete since wall pieces 10 having the largest size possible, typically wall pieces with a height greater than 25 meters, are often used, making them very heavy and very hard to transport by road, to handle, and to lift to great heights.

It is furthermore contemplated for the transverse joints 11 and vertical joints 12 of the present invention to be able to include other solutions making assembly operations easier or securing the position of the wall pieces 10 during operations of erecting the tubular tower 1 prior to post-tensioning the assembly, moment in which the tubular tower 1 can be rather unstable, but without resorting to structural connectors which, as indicated above, are expensive and complicated to install.

Figure 6:
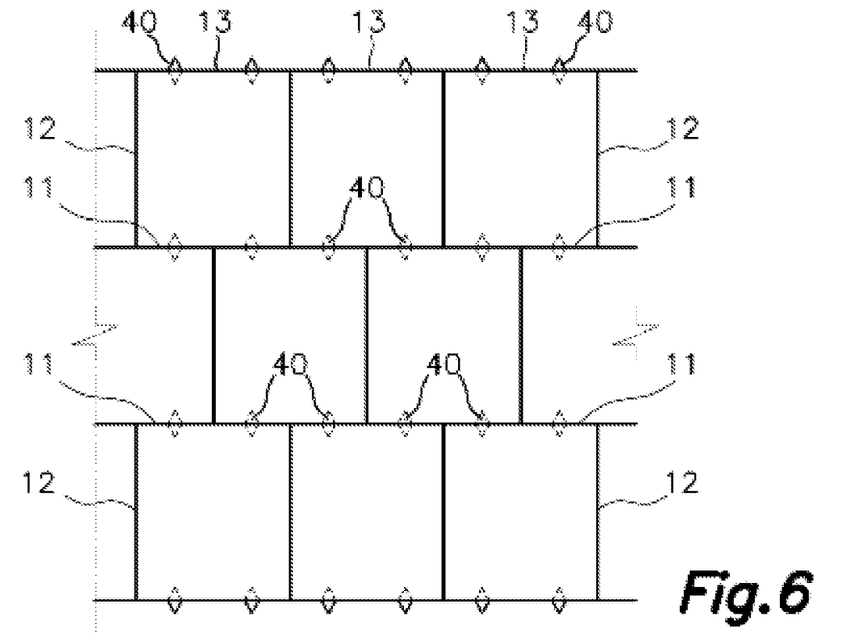
FIG. 6 shows a lateral development layout of the wall pieces making up the tubular tower according to a fourth embodiment lacking structural connectors and assembly connectors in the vertical joints, but having assembly positioners in the transverse joints in the form of steel bicones placed in recesses arranged in the transverse joint faces of the wall pieces.
Figure 7:
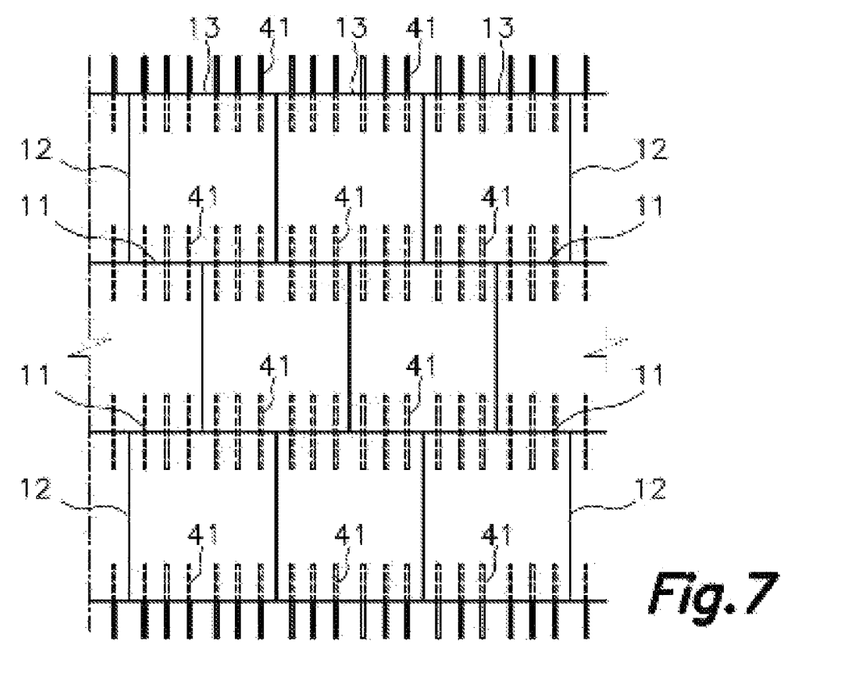
FIG. 7 shows a lateral development layout of the wall pieces making up the tubular tower according to a fifth embodiment lacking lack structural connectors and assembly connectors in the vertical joints, but having structural connectors in the transverse joints in the form of pass-through reinforcements anchored on the superposed wall pieces.

FIG. 4 shows how the transverse joint faces 13 can include a shear key configuration which increases the capacity of transmission of shear and bending stresses between the superposed annular sections 20. Similarly, FIG. 6 shows the incorporation of bicones by way of assembly positioners 40 which allow centering the position of the wall pieces 10 when they are superposed.

Alternatively or additionally, it is also contemplated to be able to intercalate between the transverse joint faces 13 and/or between the vertical joint faces 14 a film material, mortar or adhesive which will improve contact between facing faces or to generally prevent the entry of water, wind, insects or dirt. In the case of a film, for example, an elastic film, it may be included in the wall pieces 10 before lifting, so it would not entail any complication of the assembly tasks either.

In the case of using mortars or adhesives, an operator would be required to place said fresh material before placing each wall piece 10 in its final position in the tubular tower 1; these tasks would in fact entail complication when erecting the tubular tower 1, but they could be easily performed by an operator using only manual tools without involving great complexity or excessive costs.

Figure 5:
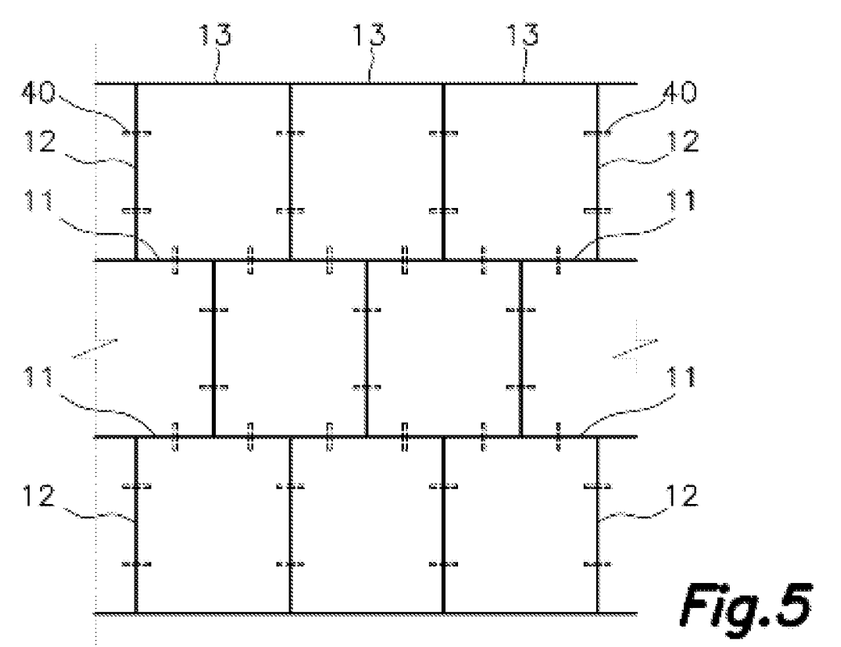
FIG. 5 shows a lateral development layout of the wall pieces making up the tubular tower according to a third embodiment in which there are no structural connectors between the wall pieces, but there are assembly connectors in the form of assembly screws or assembly pins arranged both in the transverse joints and in the vertical joints.

Optionally, said transverse joint faces 13 of superposed wall pieces 10 and/or said vertical joint faces 14 of adjacent wall pieces 10 could also be connected to one another by means of assembly connectors 40, such as assembly screws as shown in FIG. 5, for example.

Alternatively said assembly connectors 40 may be protuberances of a transverse joint face 13 inserted in complementary spaces envisaged on the facing transverse joint face 13, or pieces inserted simultaneously in facing spaces envisaged in the facing transverse joint faces 13.

The assembly connectors 40 allow securing the position of each wall piece 10 during structure assembly operations, before placing the post-tensioning cables, but are not sufficient for transmitting structural stresses envisaged at the points in which they are placed, i.e., they can transmit stresses equal to or less than 10% said stresses, the transmitted stresses therefore being considered as residual stresses. In other words, for example, the assembly connectors allows withstanding the horizontal load caused by the wind impacting against the tubular tower 1 during assembly tasks, but they would not be sufficient to withstand horizontal loads caused by the wind impacting against the blades of the turbine of the wind-driven power generator making up a large windward surface and therefore representing a great increase in the value of said horizontal load, applied furthermore to the apex of the tubular tower 1 where it causes greater bending moment on the tubular tower 1.

This can be achieved, for example, by leaving certain clearances between the assembly connectors 40 and the wall pieces 10, which would allow relative movement of a few millimeters of the wall pieces 10 attached by means of said assembly connectors 40, thereby preventing the transmission of structural stresses.

Another equivalent solution would consist of intercalating compressible elements, such as rubber elements, for example, between the assembly connectors 40 and the wall pieces 10, likewise allowing said relative movement between the wall pieces 10 without allowing the transmission of structural stresses but allowing the transmission of residual stresses to a certain extent.

It is also contemplated for said assembly connectors to be disconnected if a certain stress threshold is exceeded, such as what would occur with certain adhesives with little stress transmitting capacity, for example, which would allow keeping the wall pieces 10 in place during assembly, transmitting residual stresses but, when subjected to large structural stresses, would be disconnected. Likewise, another type of connectors, such as screws or bolts, can be sized so that they become disconnected or break when certain stresses are exceeded.

Furthermore, the residual stresses transmitted to the wall pieces would not require complex structural reinforcements within the wall piece for channeling the stresses to and concentrating them in the anchoring points of the connectors, since the stresses are readily sustained by the wall piece around the anchoring point, or would require a slight local reinforcement, which makes it easier and cheaper to manufacture the wall pieces.

Since they have lower resistance requirements than structural connectors, said assembly connectors 40 can also have a smaller size and be fewer in number, facilitating and accelerating the manual installation thereof by one or several operators with manual tools, which hardly affect the cost and time for erecting the structure.

In the case of the transverse joints 11, it is considered that structural connectors 41 connecting the superposed wall pieces 10 to one another may be present. In the example shown in FIG. 7, said structural connectors 41 consist of pass-through reinforcement bars connected simultaneously to the superposed wall pieces 10, but other embodiments are also contemplated, such as for example, structural screws, local post-tensioning cables, local concrete casting, etc. Since the number of annular sections 20 is increased with respect to a conventional equivalent structure, a possible error in the length of the wall pieces 10 of each annular section 20 may have a cumulative effect to the point where it causes a deviation from the verticality of the tubular tower 1, even despite having taken all the precautions in manufacturing the wall pieces 10 as precisely as possible. Phenomena of differential settlement of the foundation during the tasks of erecting the tubular tower 1 can also occur.

To allow reversing said deviation, it is proposed for corrective annular sections 21 to be intercalated when erecting the tubular tower 1.

A corrective annular section 21 is an annular section 20 in which the upper and lower transverse joint faces 13 of the wall pieces 10 forming it are not parallel to one another, the corrective annular section 21 thereby forming an upper and lower transverse joints 11 that are not parallel to one another. This allows the corrective annular section 21 to act as a wedge, correcting the deviation from the verticality of the tubular tower 1 in the successive annular sections 20.

Figure 9:
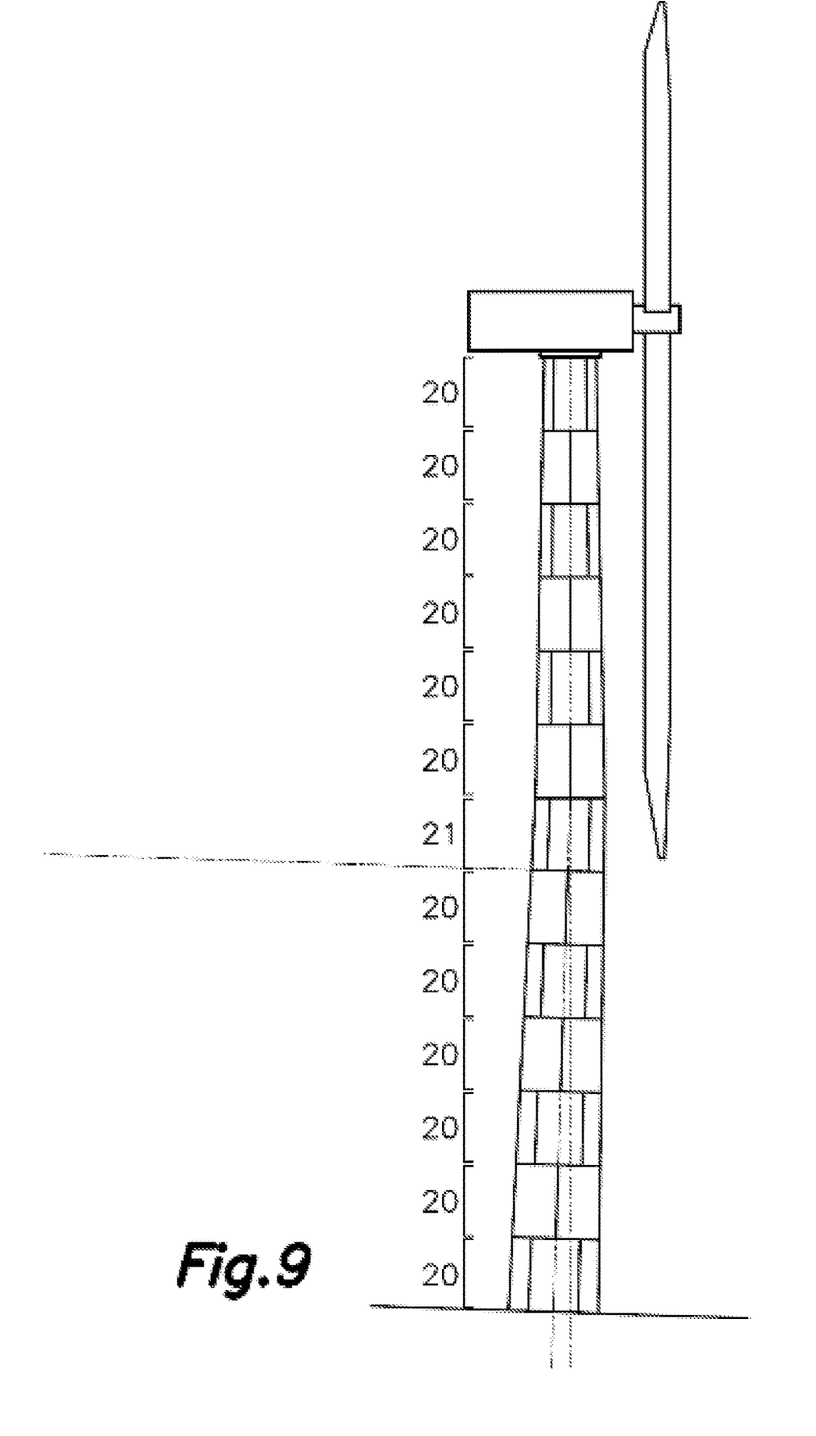
FIG. 9 shows a side elevational view of a support structure for wind-driven power generators such as the one proposed, in which the lower portion of the tubular tower has experienced a deviation in the verticality thereof while erecting said tower, and in which a corrective annular section allowing the rest of the tubular tower to be vertical has been intercalated, the deviations shown in this drawing being exaggerated for clarity purposes.

This feature can be seen in FIG. 9, where the inclinations have obviously been exaggerated to make this characteristic more prominent.

In fact, it is contemplated for a tubular tower 1 to be able to incorporate several corrective annular sections 21 along the length thereof.

Figure 10:
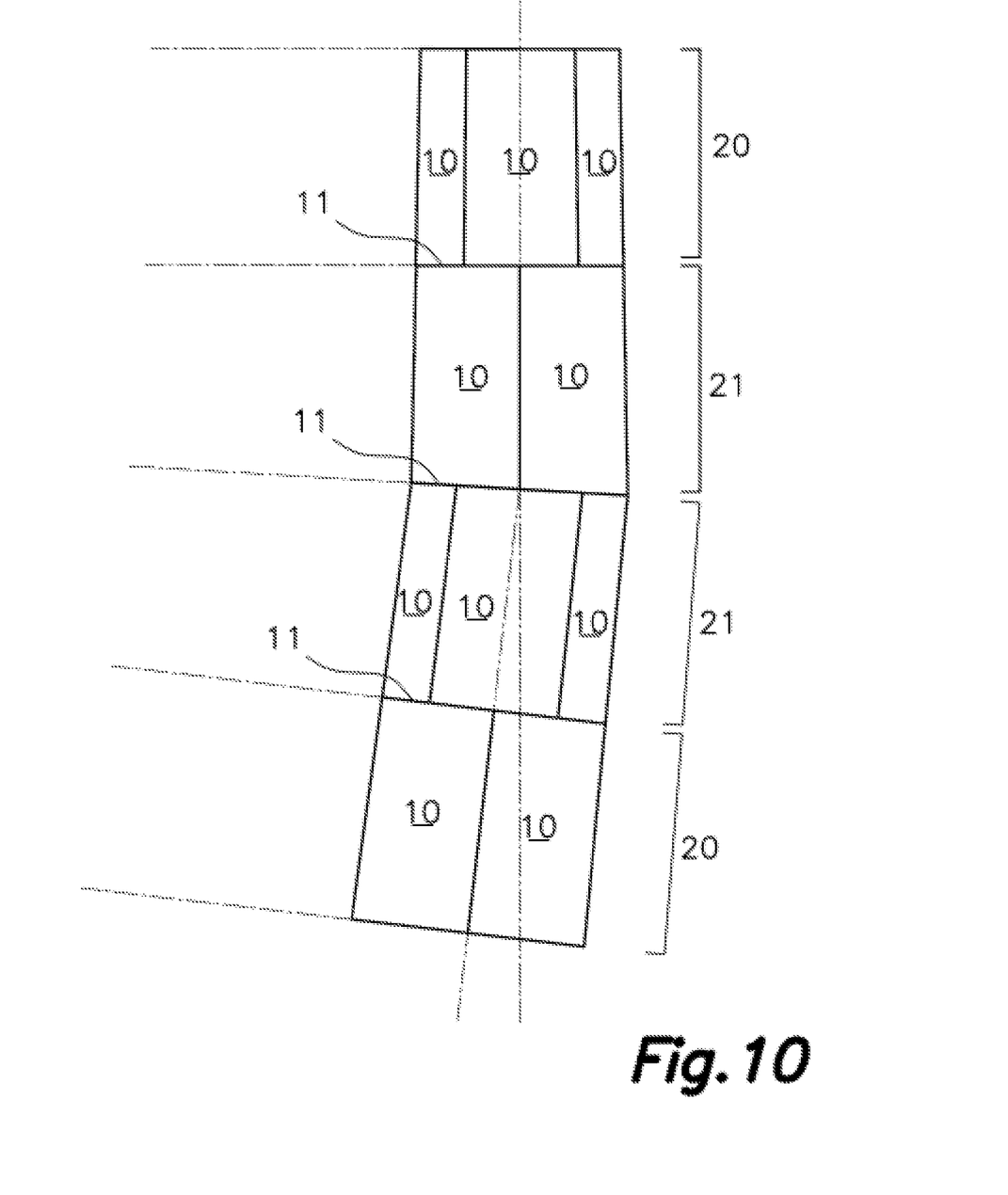
FIG. 10 shows an enlarged view of a central portion of the tubular tower in which two successive corrective annular sections have been arranged, both arranged such that their angle of correction will add up, correcting the verticality of the tubular tower between the annular section immediately below and the annular section immediately above said two successive corrective annular sections.
Figure 11:
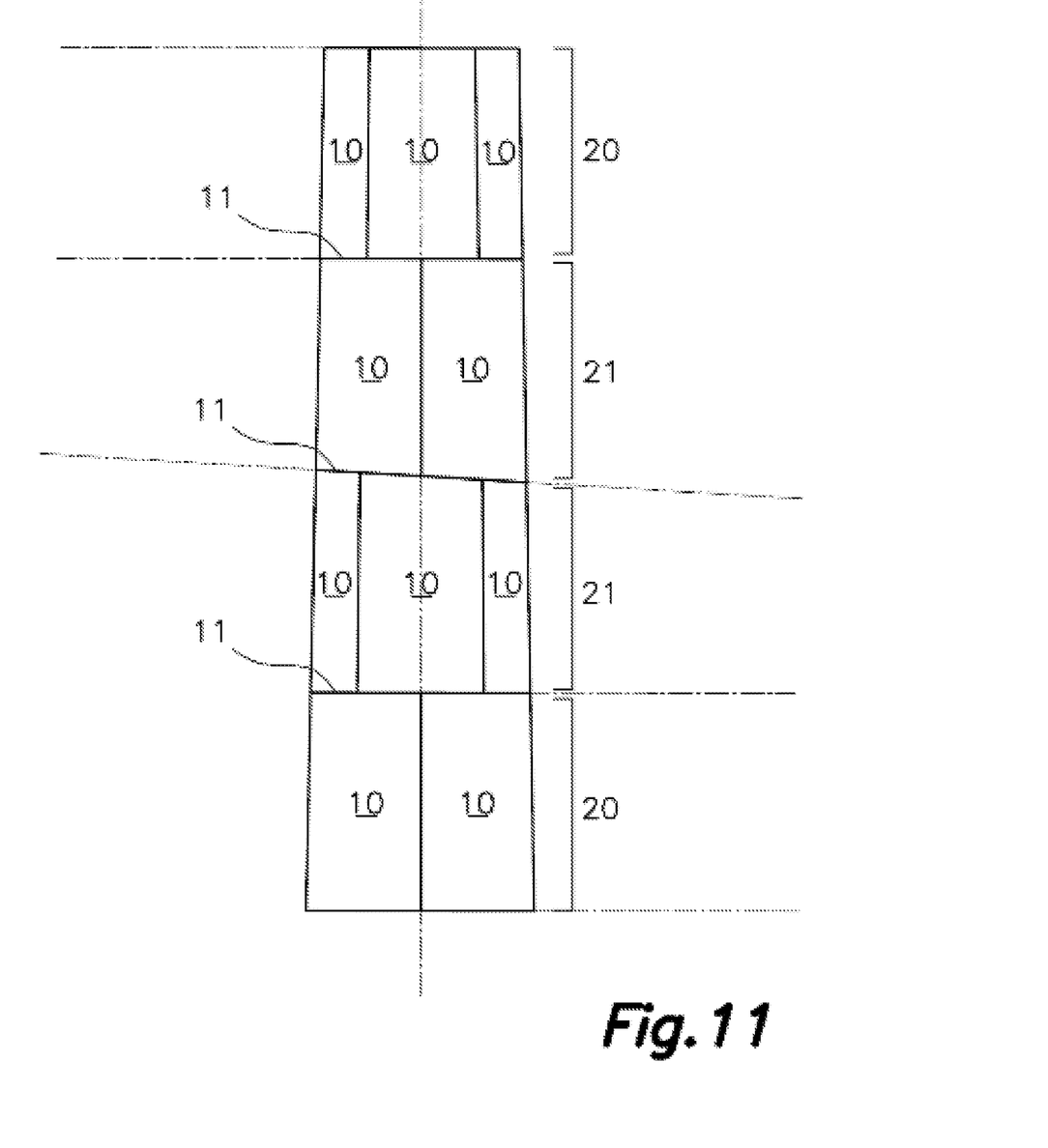
FIG. 11 shows the same portion of the tubular tower shown in FIG. 10, but in which the lower portion of the tubular tower did not show any deviation in the verticality thereof, and in which the two successive corrective annular sections have been located such that respective corrections of the verticality are canceled out.

FIGS. 10 and 11 show how two corrective annular sections 21 can be placed consecutively. Depending on the relative angular position thereof, the correction of the inclination provided by each of the corrective annular sections 21 can add up, attaining a significant correction of the inclination as the longer sides of the two corrective annular sections 21 are superposed, as shown in FIG. 10, or can cancel out one another if said longer sides of the two corrective annular sections 21 are arranged on opposite sides of the tubular tower 1, the inclination of the tubular tower 1 thus not being changed, as shown in FIG. 11.

This configuration of two consecutive corrective annular sections 21 allows for the corrective annular sections 21 to be manufactured before assembling the tubular tower 1, regardless of whether or not there is a deviation or whether or not the erection of the tubular tower 1 has been started, and allows the position where said corrective annular sections 21 must be placed to be determined during the operations of assembling the tubular tower 1 by means of precise measurements of the actual inclination of the lower part of the erected tubular tower 1 with respect to the level in which the inclusion of the corrective annular sections 21 has been envisaged, achieving correction to a greater or lesser extent or no correction at all, depending on whether or not there is a deviation of the tubular tower 1 while erecting said tower.

It will be understood that the different parts making up the invention described in one embodiment can be freely combined with parts described in other different embodiments, although said combination has not been explicitly described, provided that the combination does not entail a disadvantage.

The invention claimed is:

1. A support structure for wind-driven power generators comprising:
    a tubular tower provided with a hollow inner space, said tubular tower including:
    multiple superposed annular sections defining transverse joints between the superposed annular sections, each annular section being formed by at least two wall pieces made of prefabricated concrete defining vertical joints between the at least two wall pieces, each wall piece having a circular arc- or polygonal arc-shaped horizontal section the length of which defines a width of the wall piece, a straight vertical section the length of which defines a height of the wall piece, two transverse joint faces of constant or variable thickness and two vertical joint faces of constant or variable thickness defining a thickness of the wall piece on the perimeter thereof, the height of each wall pieces being less than twice the width thereof;
    a foundation defining a support plane for the tubular tower;
    upper fixing configurations connected to an uppermost annular section of the tubular tower and lower fixing configurations connected to the foundation;
    post-tensioning cables connecting the upper fixing configurations and lower fixing configurations compressing the superposed wall pieces with one another, said post-tensioning cables running along the hollow inner space of the tubular tower;
    the vertical joints of successive annular sections do not coincide with one another;
    in the vertical joints, the vertical joint faces of two adjacent wall pieces of the same annular section are arranged facing to each other;
    the vertical joints lack structural connectors configured to transmit structural stresses between the vertical joint faces facing to each other preventing the transmission of structural stresses between the vertical joint faces facing to each other, allowing an independent structural behavior of at least two wall pieces of the same annular section;
    the transverse joint faces of wall pieces of successive annular sections are arranged facing to each other and in contact, being pressed together by the post-tensioning cables.

2. The structure according to claim 1, wherein the vertical joints lacks of structural connectors selected among:
    structural screws, structural bolts, local post-tensioning, annular post-tensioning around an annular section, shear key configurations of the facing vertical joint faces and/or cast-in-situ concrete attachments between the facing vertical joint faces.

3. The structure according to claim 1, wherein the vertical joint faces of two adjacent wall pieces of the same annular section are separated from one another defining a gap.

4. The structure according to claim 1, wherein the vertical joint faces of two adjacent wall pieces of the same annular section and/or the transverse joint faces of two superposed wall pieces of successive annular sections are attached to each other by assembly connectors sized and configured for holding the wall pieces in place during assembly and configured for transmitting, at most, residual stresses between the wall pieces attached through said assembly connectors and for being disconnected from at least one of the wall pieces to which are attached when subjected to a stress exceeding said residual stress, said residual stresses being less than 10% of the structural stresses envisaged at that point of the structure.

5. The structure according to claim 1, wherein the transverse joint faces of superposed wall pieces are attached to one another by means of assembly connectors sized and configured for holding the wall pieces in place during assembly and configured for transmitting, at most, residual stresses less than 10% of the structural stresses envisaged at that point of the structure and/or by means of structural connectors configured to transmit structural stresses and/or by means of shear key configurations and/or by means of positioners.

6. The structure according to claim 1, wherein the transverse joints lack structural connectors, for the transmission of structural stresses, selected among: structural screws, structural bolts, local post-tensioning, mortar, structural adhesives and/or cast-in-situ concrete attachments between the facing vertical joint faces.

7. The structure according to claim 4, wherein the assembly connectors are selected among: assembly screws, assembly bolts, mortar, and/or adhesives.

8. The structure according to claim 1, wherein the wall pieces forming at least one annular section of the tubular tower have non-parallel transverse joint faces, defining a corrective annular section with a lower transverse joint and with an upper transverse joint on planes not parallel to one another.

9. The structure according to claim 8, wherein the tubular tower includes two consecutive corrective annular sections.

10. The structure according to claim 8, wherein the tubular tower includes multiple non-consecutive corrective annular sections.

11. The structure according to claim 1, wherein the upper fixing configurations are integrated in an uppermost metal ring of the tubular tower, said uppermost metal ring being supported on the transverse joint faces of the wall pieces of the last annular section of the tubular tower.

12. The structure according to claim 11 wherein the uppermost metal ring includes anchorages for fixing a nacelle of a wind-driven power generator.

13. The structure according to claim 2, wherein the vertical joint faces of two adjacent wall pieces of the same annular section and/or the transverse joint faces of two superposed wall pieces of successive annular sections are attached to one another by means of assembly connectors sized and configured for holding the wall pieces in place during assembly and configured for transmitting, at most, residual stresses between the wall pieces attached through said assembly connectors.

14. The structure according to claim 1, wherein the transverse joints of the transverse joint faces of wall pieces of successive annular sections are arranged facing and contacting one another, being pressed together by said post-tensioning cables, and wherein said facing and contacting transverse joint faces define through contact a structural connection for the transmission of structural stresses.

15. The structure according to claim 14, wherein the wall pieces forming at least one annular section of the tubular tower have non-parallel transverse joint faces, defining a corrective annular section with a lower transverse joint and with an upper transverse joint on planes not parallel to one another.

16. The structure according to claim 1, wherein the wall pieces forming at least one annular section of the tubular tower have non-parallel transverse joint faces, defining a corrective annular section with a lower transverse joint and with an upper transverse joint on planes not parallel to one another.

* * * * *